United States Patent Office 3,326,816
Patented June 20, 1967

3,326,816
REACTIVATING SOLID PHTHALOCYANINE CATALYST
Peter Urban, Northbrook, Ill., assignor to Universal Oil Products Company, Des Plaines, Ill., a corporation of Delaware
No Drawing. Filed Aug. 12, 1964, Ser. No. 389,179
7 Claims. (Cl. 252—413)

This invention relates to a novel method of reactivating solid phthalocyanine catalysts which have become deactivated during use.

Phthalocyanine catalysts are presently being used for the oxidation of acidic compounds. In one application hydrocarbon gases and distillates containing mercaptans are subjected to reaction with air or other oxidizing gas in the presence of phthalocyanine catalyst to convert the mercaptans to disulfides. This reaction is referred to in the industry as "sweetening" and means that a charge containing mercaptans is converted into a product containing a lower concentration of mercaptans. Substantially pure mercaptan fractions also may be oxidized in the presence of phthalocyanine catalysts to produce disulfides. Other substrates contain mercaptans and these also may be oxidized in the presence of phthalocyanine catalysts to reduce the mercaptan content thereof. While the phthalocyanine catalysts are particularly advantageous for use in the oxidation of mercaptans, it is understood that these catalysts also may be used for the oxidation of other acidic compounds, as well as for the oxidation of other organic compounds or mixtures, as, for example, the oxidation of cumene or derivatives thereof.

In many applications advantages appear for the use of the phthalocyanine catalyst as a solid composite with a suitable carrier. While the solid composite containing the phthalocyanine catalyst is very effective and possesses a relatively long catalyst life, the catalyst does become deactivated after long periods of use. The present invention provides a novel method of reactivating the catalyst after deactivation. The reactivation may take different forms depending upon the particular type and extent of deactivation sustained by the catalyst.

In one embodiment the present invention relates to a method of reactivating used solid phthalocyanine catalyst which comprises washing said catalyst with an alcoholic solution.

When the catalyst has undergone only a mild deactivation, the catalyst may be reactivated sufficiently for further use in the particular process by washing the catalyst with an alcoholic solution. After further use following the treatment described above or when the catalyst has become deactivated to a greater degree, the catalyst may be reactivated by first removing soluble contaminants by means including an alcoholic wash and then reimpregnating the solid particles with additional phthalocyanine catalyst contained in an alcoholic menstruum.

As hereinbefore set forth the phthalocyanine catalyst is particularly applicable to the treatment of sour hydrocarbon fractions including hydrocarbon gases, sour gasoline including cracked gasoline, straight run gasoline, natural gasoline or mixtures thereof, naphtha, jet fuel, kerosene, aromatic solvent, stove oil, range oil, fuel oil, etc. Other hydrocarbon distillates include lubricating oil and various specialty oils. Still other sour substrates include aqueous streams as, for example, well water or other water streams containing hydrogen sulfide, mercaptans, etc., sour water effluents discharged from various industrial processes, etc. Also as hereinbefore set forth, the phthalocyanine catalyst may be used for the oxidation of other organic compounds including alcohols, ketones, aldehydes, etc. Regardless of the particular use in which the phthalocyanine catalyst is employed, the catalyst becomes deactivated and is reactivated by the novel method of the present invention.

Any suitable phthalocyanine catalyst is used in the present invention and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, nickel phthalocyanine, chromium phthalocyanine, etc. The metal phthalocyanine preferably is used as a derivative thereof. A particularly preferred derivative is the sulfonated derivative. Thus a particularly preferred phthalocyanine catalyst comprises cobalt phthalocyanine sulfonate. In one embodiment the catalyst comprises cobalt phthalocyanine monosulfonate and also contains the disulfonate. Another preferred catalyst comprises vanadium phthalocyanine sulfonate. These compounds may be obtained from any suitable source or may be prepared in any suitable manner as, for example, by reacting cobalt, vanadium or other metal phthalocyanine with fuming sulfuric acid. While the sulfonic acids are particularly preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction, the acid chloride is formed and may be converted to the desired carboxylated derivative by conventional hydrolysis.

As hereinbefore set forth, the phthalocyanine catalyst is composited with a suitable adsorptive carrier. The carrier should be insoluble in or substantially unaffected by the treating solution and reactants under the condition prevailing in the treating zone. Activated carbon is particularly preferred because of its high adsorptivity and stability under these conditions. Other carbon carriers include coke, charcoal which may be obtained from any suitable source including bone char, wood charcoal, charcoal made from cocoanut or other nut shells, fruit pits, etc. Other carriers include silica as, for example, sand, glass beads, etc., clays and silicates including those synthetically prepared and naturally occurring, preferably acid, heat or otherwise treated, as, for example, attapulgas clay, china clay, diatomaceous earth, feldspar, fuller's earth, halloysite, kaolin, kieselguhr, mica, montmorillonite, pumice, etc., alumina and particularly alpha alumina including corundum, emery, etc., ceramics, porcelain, various magnesium compounds, titanium compounds, zirconium compounds, etc. The choice of carrier will be made with reference to its adsorptive or spacing properties and its stability in the environment prevailing in the treating zone.

The composite of phthalocyanine and carrier may be prepared in any suitable manner. In one method the carrier may be formed into particles of uniform or irregular size and shape, including spheres, pills, pellets, rings, saddles, flakes, etc., and the carrier is intimately contacted with a solution of the phthalocyanine catalyst. While an aqueous alkaline solution of the phthalocyanine catalyst may be used, a preferred solution also contains an alcohol and particularly methanol. Other alcohols comprise ethanol, propanol, butanol, etc. In one embodiment the carrier particles are soaked, dipped, suspended, immersed or otherwise contacted with the solution containing the phthalocyanine catalyst. In another method the solution is sprayed onto, poured over or contacted otherwise with the carrier. Excess solution may be removed in any suitable manner, and the carrier containing the catalyst is allowed to dry at room temperature, dried in an oven or by means of hot gasses passed thereover, or in any other suitable manner.

In general it is preferred to composite as much catalyst with the carrier as will form a stable composite, although a lesser amount may be so deposited, if desired. In one preparation, 1% by weight of cobalt phthalocyanine sulfonate catalyst was composited with activated carbon by soaking granules of the carbon in a solution of the phthalocyanine catalyst. In another method, the carrier may be deposited in the treating zone and the phthalocyanine catalyst solution passed therethrough in order to form the catalyst composite in situ. If desired, the solution may be recycled one or more times in order to prepare the desired composite. In still another embodiment the carrier may be deposited in the treating chamber and the chamber filled with a solution of the catalyst, thereby forming the composite in situ.

In use in the oxidation process the solid catalyst composite is disposed as a fixed bed in a reaction zone. The sour hydrocarbon distillate or other charge to be oxidized, together with an oxidizing agent and alkaline solution, is passed, at the desired temperature and pressure, into contact with the catalyst bed in either upward or downward flow. Oxidation is effected at ambient or slightly elevated temperature which generally will not exceed about 150° F., although a higher temperature up to 300° F. or more may be employed when advantages appear therefor. Atmospheric pressure or slightly superatmospheric pressure, which may range up to 100 pounds per square inch generally is used, although a superatmospheric pressure up to 1,000 pounds or more per square inch may be employed when desired. The time of contact in the treating zone is selected to effect the desired oxidation and may range from a liquid hourly space velocity of 0.1 to 100 or more, depending upon the size of the treating zone, the amount of catalyst and the particular charge being treated.

The oxidation reaction preferably is effected in the presence of an alkaline reagent. Any suitable alkaline reagent may be employed. A preferred reagent comprises an aqueous solution of an alkali metal hydroxide such as sodium hydroxide solution (caustic), potassium hydroxide solution, etc. Other alkaline solutions include aqueous solutions of lithium hydroxide, rubidium hydroxide, cesium hydroxide, etc., although, in general, these hydroxides are more expensive and therefore are not preferred for commercial use. In some cases the alkaline solution will contain a solubilizer or solutizer including, for example, alcohols such as methanol, ethanol, etc., phenols, cresols, etc., tannin, isobutyrate, etc. A particularly preferred alkaline solution is an aqueous solution of from about 1% to about 50% by weight concentration of sodium hydroxide and, when employed, a preferred solutizer is methanol which may be used in a concentration of from about 1 to about 200 volume percent of the caustic or other alkaline solution. While an alkaline solution is preferred, in another embodiment a solution in a non-alkaline solvent may be employed, but generally the treating is effected in the presence of at least a trace of alkalinity.

Any suitable oxidizing agent may be employed. While air is preferred, it is understood that oxygen, oxygen containing gases or other suitable oxidizing agent may be employed. In some cases the sour hydrocarbon distillate or other substrate may contain entrained oxygen or air in sufficient concentration for the purpose. Generally, however, it is preferred to introduce air or other oxidizing agents into the reaction zone. The amount of air or oxidizing agent should be sufficient to effect oxidation of the mercaptans and/or other compounds. Generally an excess of oxidizing agent is used in order to insure that the desired oxidation is accomplished.

In many cases it is desirable to pretreat the charge with alkaline solution to remove the easily removable acidic components including hydrogen sulfide when present. Any suitable alkaline solution may be used for this purpose and generally will be selected from the alkaline solutions specifically set forth hereinabove.

After use in the oxidation reaction the solid phthalocyanine composite becomes deactivated. The extent of deactivation will depend upon the particular charge being treated, the particular catalyst being used, the conditions of treatment and the length of time that the catalyst is used. In many cases the treated product must meet a mercaptan specification and the catalyst is considered deactivated when the product no longer meets the specification. When this occurs the catalyst is reactivated by the novel method of the present invention. As herein before set forth the reactivation will take different forms depending upon the extent of deactivation of the catalyst. Regardless of the particular method of reactivation, the reactivation must include the use of an alcoholic solution.

The alcoholic solution for use in accordance with the present invention will depend upon the particular reactivation and may comprise one or more of the use of substantially pure alcohol, aqueous alcoholic solution of from about 25% to 95% concentration and preferably from about 70% to about 90% concentration, alkaline-alcoholic solution of from about 1% to about 50% and preferably 5% to 20% by weight of suitable alkaline reagent including sodium hydroxide, potassium hydroxide, lithium hydroxide, cesium hydroxide, ammonium hydroxide, etc., and more preferably such a solution also containing water, the water ranging from 10% to 300% by weight of the alcohol-alkaline constituents, or an acidic-alcoholic solution, which also may contain water and in which the acid is used in a concentration from about 0.1% to about 25% and preferably from 0.2% to 2% by volume of the total solution. Any suitable acid may be employed including hydrochloric acid, sulfuric acid, etc., and preferably an organic acid including formic acid, acetic acid, propionic acid, etc. It is understood that two or more of these solutions may be used in successive steps. The particular alcoholic solution to be used will depend upon the particular method of reactivating the catalyst as will be exemplified further hereinbelow.

Any suitable alcohol is used in accordance with the present invention. Methanol is particularly preferred. Other alcohols include ethanol, propanol, butanol, etc.

When the catalyst to be reactivated has undergone only mild deactivation, it may be reactivated sufficiently for the purpose by washing with the alcoholic solution. Generally it is preferred to first wash the catalyst composite with water in order to remove any adhering or entrained material which can be readily removed in this manner. The water washing is effected at ambient temperature or an elevated temperature up to about 200° F. or higher when superatmospheric pressure is employed to maintain the water in liquid phase. The water then may be discarded or used for any other suitable purpose. Following the water washing the catalyst is washed with the alcoholic solution. The washing with the alcoholic solution may be effected at ambient temperature or slightly elevated temperature which generally will not exceed about 180° F. but may be higher when used under superatmospheric pressure. However, the maximum temperature employed should be below that at which the alcoholic solution is in liquid phase under the pressure employed. Thus temperatures up to 300° F. or more with suitable superatmospheric pressure to maintain liquid phase may be employed when desired. Contacting of the catalyst with alcoholic solution is contained until the catalyst is reactivated sufficiently for the purpose. The alcoholic solution containing contaminants removed from the catalyst may be discarded or treated in any suitable manner to separate the methanol from the contaminants and the recovered methanol may be recycled for further contact with the catalyst composite.

The above procedure is satisfactory when the catalyst responds sufficiently to satisfy the requirements of the oxidation process. However, when the catalyst does not respond sufficiently by such treatment or when the catalyst has become deactivated to a greater extent, a more severe reactivation is required. In such cases the catalyst preferably first is given the water wash treatment heretofore described, then is washed with an alcoholic solution and finally is reimpregnated with additional phthalocyanine catalyst. In this embodiment in place or in addition to the water washing, the catalyst may be treated with steam. In many cases it is desirable to wash the catalyst with an acidic material prior to reimpregnation and this may be accomplished by following the water and/or steaming treatment with a wash with a dilute or weak acid solution as, for example, an aqueous solution containing acetic acid, propionic acid, etc., or a low concentration of inorganic acid and particularly hydrochloric acid or sulfuric acid. In some cases an acidic alcoholic solution is used. The treatment with the acidic solution is continued until the solution being withdrawn from the reaction zone is neutral or acidic. In order to be sure that the catalyst no longer retains alkalinity the solution may be made further acidic by adding some hydrochloric acid, HCl, or other acid thereto. This treatment preferably is followed by drying the catalyst by air blowing, blowing with hot gases or in any other suitable manner. Regardless of which method is used, the catalyst is washed with an alcoholic solution, preferably methanolic solution, as hereinbefore described. The alcoholic solution may be discarded or recovered in any suitable manner.

Following the above treatment, the solid particles are now ready for reimpregnation with additional phthalocyanine catalyst. In a preferred embodiment a solution of the phthalocyanine catalyst in alcohol is prepared and this solution is contacted with the solid particles in the manner heretofore described in connection with the preparation of the catalyst. When the impregnation is effected in situ; that is, when the solid particles are disposed in the reaction zone, the alcoholic solution containing the phthalocyanine catalyst is recirculated over the solid particles until the phthalocyanine catalyst no longer is adsorbed by the solid particles. This is a preferred procedure but, when desired, the solid particles may be withdrawn from the reaction zone and soaked or otherwise contacted with the alcoholic solution containing the phthalocyanine catalyst. While it is preferred to use an alcoholic solution for this purpose, it is understood that an aqueous solution and preferably an alkaline solution, such as aqueous ammonium hydroxide solution, aqueous caustic solution etc. or such solutions also containing alcohol, may be employed. The reimpregnation may be effected at ambient temperature or slightly elevated temperature which generally will not exceed about 200° F.

The following examples are introduced to illustrate further the novelty and utility of the present invention but not with the intention of unduly limiting the same.

*Example I*

The catalyst of this example comprises 1% by weight of cobalt phthalocyanine sulfonate on activated carbon and was prepared as follows. The carbon is a commerically available product marketed under the trade name of "Nuchar WA" and was in granules of 4–30 mesh size (U.S. Sieve Series). It is stated that the carbon is formed from residual organic material which is recovered during the manufacture of pulp and then is carbonized and activated by heating. A suspension of one gram of a mixture predominating in cobalt phthalocyanine monosulfonate and cobalt phthalocyanine disulfonate was prepared in 200 ml. of methanol. Ninety-nine grams of the activated carbon were put in a mixing zone and were covered with 400 ml. of methanol. The mixture of cobalt phthalocyanine sulfonate in methanol was added to the mixing zone with stirring. Stirring was continued for 20 minutes, after which the mixture was allowed to stand for six hours. The composite of carbon and cobalt phthalocyanine sulfonate then was filtered off from the methanol and dried overnight at 250° F. The final weight of the composite was 100 grams. The filtrate was essentially water white, thus indicating complete adsorption of the cobalt phthalocyanine sulfonate.

The catalyst prepared in the above manner was used as a fixed bed in a reaction zone for the sweetening of a commercial sour kerosene having a mercaptan sulfur content of 0.0493% by weight, a Saybolt color of +22 and a boiling range of from 370° to 512° F. The sour kerosene, caustic-methanol solution and air were passed upwardly through the catalyst bed at a temperature ranging from 100° to 140° F. and at substantially atmospheric pressure. A series of runs were made with the object of reducing the mercaptan sulfur content of the kerosene to below 30 parts per million and also to maintain a Saybolt color of above 15.

One evaluation in this series of runs related to the reactivation of the catalyst by washing with methanol. The catalyst was used for about 250 hours of operation, after which time the mercaptan sulfur content gradually increased from about 18 to about 30 parts per million. At this time the flow of kerosene, caustic-methanol solution and air to the catalyst was discontinued. The catalyst then was first washed in situ with water at 140° F. and subsequently was washed with methanol of about 95% concentration. The washing with methanol was effected at 140° F. for four hours at a liquid hourly space velocity of 2. Following this treatment sweetening of kerosene was resumed. The mercaptan sulfur content of the kerosene was lowered to 17.5 parts per million and the treated kerosene had a Saybolt color of about 21. This run continued for about 320 hours, at which time the mercaptan sulfur content of the treated kerosene had increased to about 30 parts per million.

From the above data it will be seen that washing of the used catalyst with methanol served to restore the activity of the catalyst sufficiently so that the catalyst could still be used to produce a treated product containing less than 30 parts per million of mercaptan sulfur. It will be noted that the reactivated catalyst served satisfactorily for 320 hours of operation.

*Example II*

After further use of the catalyst for sweetening of the kerosene as described in Example I, the mercaptan content of the kerosene product again gradually increased to about 30 parts per million. At this time it was decided to reactivate the catalyst more severely and this was done as follows. The catalyst bed was water washed and then a solution of 2% by weight of glacial acetic acid in methanol of about 95% concentration was prepared and this solution was passed upwardly through the catalyst at a temperature of about 100° F. and at a liquid hourly space velocity of 2. This was continued for about four hours until the effluent from the catalyst bed was acidic. The acidic methanol solution then was drained from the catalyst bed. Methanol then was pumped through the catalyst bed at a liquid hourly space velocity of 2. Following this treatment, the methanol was drained from the reaction zone. The solid bed was reimpregnated with additional cobalt phthalocyanine sulfonate catalyst by forming a solution of 0.15 gram of cobalt phthalocyanine sulfonate heretofore described in 200 cc. of methanol and recycling this mixture through the catalyst bed for about six hours. After adsorption of the cobalt phthalcyanine sulfonate on the activated carbon, the methanol solution was drained off and the catalyst then was used for the sweetening of additional sour kerosene as described in Example I. At the beginning of the run using the reimpregnated catalyst, the mercaptan sulfur content of the treated kerosene was about 18 parts per million and the run was continued for a total of 336 hours of operation. At the end of this run, the mercaptan sulfur content of the kerosene product had increased to about 27 parts per million.

Here again it will be noted that reactivation of the catalyst was effected satisfactorily to permit further use of the catalyst to prepare a treated product meeting specifications. Up to the time of this reactivation, the catalyst had been used for a long period and therefore had become deactivated to a greater extent than as described in Example I and it was necessary to utilize both the washing with methanol and reimpregnation with additional phthalocyanine catalyst to restore the activity of the catalyst to a satisfactory degree.

I claim as my invention:

1. The method of reactivating used solid composite of adsorptive carrier and phthalocyanine catalyst which comprises washing said composite with an alcohol and then reimpregnating the composite with additional phthalocyanine catalyst in admixture with an alcohol.

2. The method of reactivating used solid composite of activated carbon and phthalocyanine catalyst which comprises washing said composite with methanol and then reimpregnating the composite with additional phthalocyanine catalyst in admixture with methanol.

3. The method of reactivating used solid composite of activated carbon and cobalt phthalocyanine sulfonate catalyst which comprises washing said composite with methanol and then reimpregnating the composite with additional cobalt phthalocyanine sulfonate catalyst in admixture with methanol.

4. The method of reactivating used solid composite of activated carbon and vanadium phthalocyanine sulfonate catalyst which comprises washing said composite with methanol and then reimpregnating the composite with additional vanadium phthalocyanine sulfonate catalyst in admixture with methanol.

5. The method or reactivating used solid composite of adsorptive carrier and phthalocyanine catalyst which comprises washing said composite with water, washing said composite with an acidic solution, washing said composite with alcohol, and finally reimpregnating said composite with additional phthalocyanine catalyst.

6. The method of reactivating used solid composite of activated carbon and cobalt phthalocyanine sulfonate catalyst which comprises washing said composite with water, washing said composite with an acidic solution, washing said composite with methanol, and finally reimpregnating said composite with additional cobalt phthalocyanine sulfonate catalyst in admixture with methanol.

7. The method of reactivating used solid composite of activated carbon and vanadium phthalocyanine sulfonate catalyst which comprises washing said composite with water, washing said composite with an acidic solution, washing said composite with methanol, and finally reimpregnating said composite with additional vanadium phthalocyanine sulfonate catalyst in admixture with methanol.

References Cited
UNITED STATES PATENTS

| | | | |
|---|---|---|---|
| 2,949,421 | 8/1960 | Mills | 252—414 |
| 3,053,774 | 9/1962 | Walther | 252—414 |

OSCAR R. VERTIZ, *Primary Examiner.*

A. GRIEF, *Assistant Examiner.*